April 8, 1952 W. A. STONE 2,591,741
CAGING MEANS FOR GYROSCOPES HAVING
TWO DISPLACEMENT AXES
Filed Nov. 29, 1946 3 Sheets-Sheet 1

Inventor
WAYNE STONE
BY George H. Fisher
Attorney

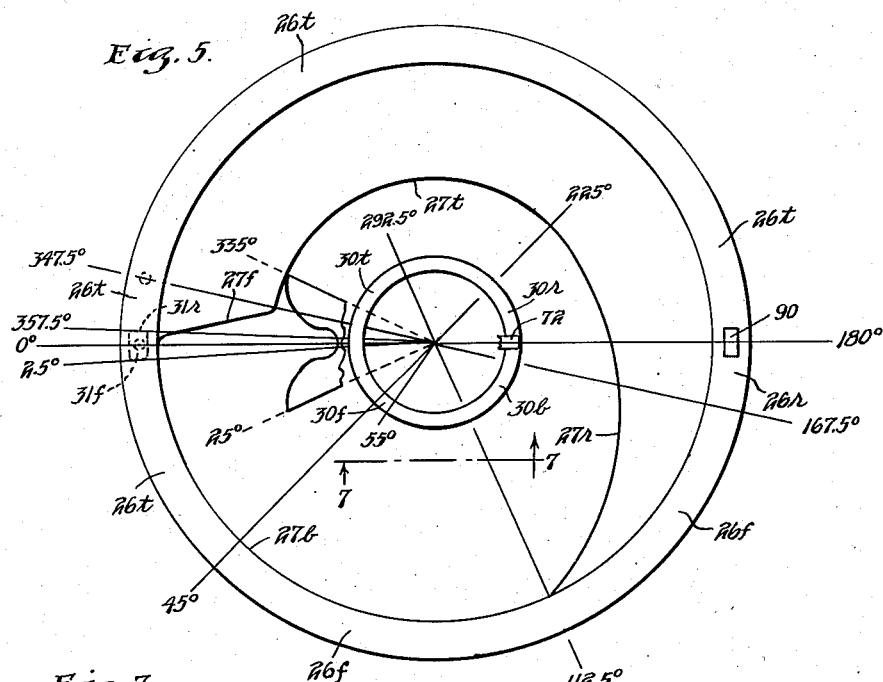
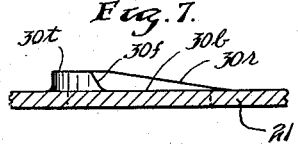
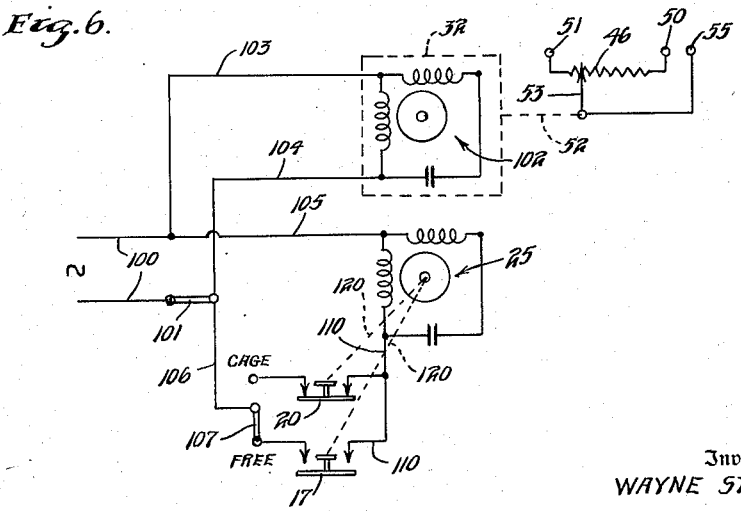
Inventor
WAYNE STONE
George H. Fisher
Attorney

Patented Apr. 8, 1952

2,591,741

UNITED STATES PATENT OFFICE 2,591,741

CAGING MEANS FOR GYROSCOPES HAVING TWO DISPLACEMENT AXES

Wayne A. Stone, St. Louis Park, Minn., assignor to Minneapolis-Honeywell Regulator Company, Minneapolis, Minn., a corporation of Delaware Application November 29, 1946, Serial No. 713,036

15 Claims. (Cl. 74—5.1)

This invention relates to the field of aircraft instruments, and more particularly to caging means for directional gyroscopes used in such instruments.

The use of a gyroscope having a horizontal spin axis to control the course of a craft has become quite common, but the gyroscope as a sole standard of azimuth is subject to certain objections. For instance, while it is theoretically possible to neutralize the apparent precession of the gyroscope, due to the earth's rotation in space by a real and opposite precession caused by properly unbalancing the gyroscope, exact neutralization is unobtainable as a practical matter, and in any case the conditions are at once changed as soon as the craft moves to a higher or lower latitude, so that the neutralization becomes less and less exact. These factors, together with bearing friction, windage if the rotor is not truly balanced, and other small forces, bring about drift in the spin axis of the gyroscope from its theoretical direction in space, and means must be provided to return the axis to a known direction. For this purpose caging means have been devised.

Again, there are two principal systems using such directional gyroscopes, one in which the gyroscope is mounted with unlimited freedom of rotation in azimuth, and one in which its rotation in azimuth is limited: each system has its advantages and disadvantages. The present invention relates to the second of these systems, in which means must be provided to keep the gyroscope from injury and from tumbling when the craft turns through an angle greater than that permitted by the limited freedom of the gyroscope. Here again a caging means is necessary.

It is an object of this invention to provide a caging mechanism for a directional gyroscope which is very rapid in action and yet very smooth in operation.

It is an object of this invention to provide such a caging mechanism in which speed of action is obtained by destroying the spatial rigidity of the gyroscope as the first step in caging.

It is a further object of the invention to provide such a caging mechanism in which the gyroscope is caged about its precession axes in sequence after the spatial rigidity of the gyroscope has been destroyed.

It is a further object of the invention to provide an automatic caging mechanism which operates without attention, after its operation is initiated, to cage the gyroscope as described above.

It is a further object of the invention to provide an automatic caging means for a gyroscope in which caging and uncaging functions proceed automatically to completion on successive initial operations of a control member.

Another object of the invention is to provide motor actuated caging and uncaging means for a directional gyroscope in which a unidirectionally driven cam provides a plurality of camming surfaces for actuating various mechanisms to cooperate in sequence in smooth and rapid caging of the gyroscope as already set forth, and in smooth and even more rapid uncaging of the gyroscope.

A further object of the invention is to provide such a mechanism in which the cam not only actuates the caging mechanism, but also controls the energization of its own driving motor.

A still further object of the invention is to so construct an instrument as described above that independent mechanical means are provided, to cooperate with the several surfaces of the cam, for centering and locking the gyroscope about each of two precession axes and for releasably preventing rotation of the gyro about one of these axes.

Various other objects, advantages and features of novelty which characterize my invention are pointed out with particularly in the claims annexed hereto and forming a part hereof. However, for a better understanding of the invention, its advantages and objects attained by its use, reference should be had to the subjoined drawing, which forms a further part hereof, and to the accompanying descriptive matter, in which I have illustrated and described certain preferred embodiments of my invention.

In the drawing:

Figure 5 is a plan view of cams used in the invention, parts being shown in full or broken away for the sake of illustration:

Figure 6 is a diagram showing the electrical connections of my gyroscope: and

Figure 7 is a fragmentary elevation, generally in section taken along the line 7—7 of Figure 5, giving further details of one of the camming surfaces.

Construction

Figure 2:
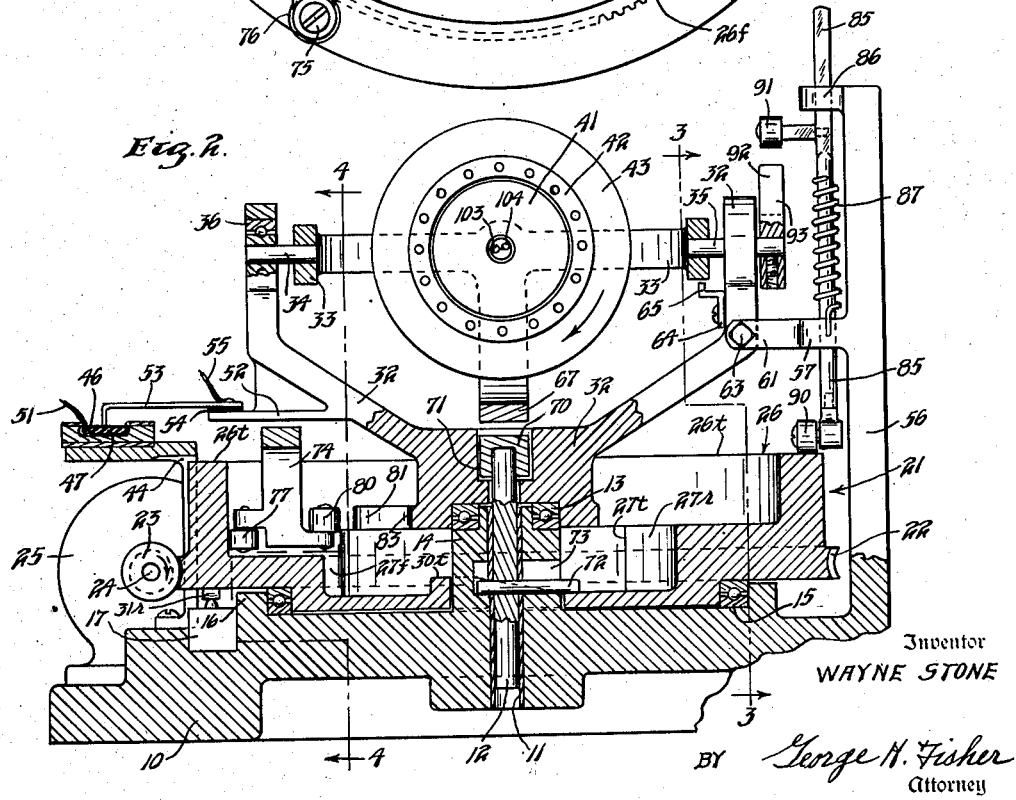
Figure 2 is an elevation, generally in section taken along the line 2—2 of Figure 1, looking in the direction of the arrow, with certain parts shown in full or cut away for the sake of illustration.
Figure 4:
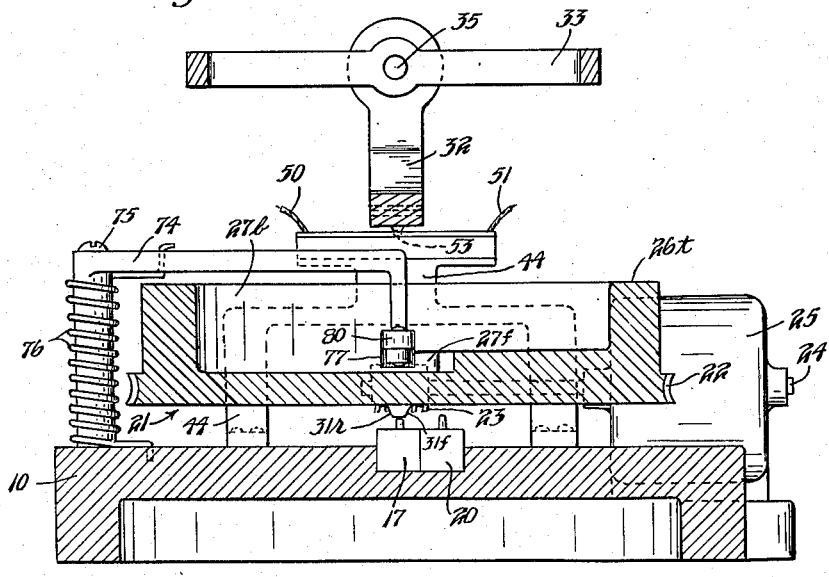
Figure 4 is a view similar to Figure 3, the section, however, being taken generally along a line 4—4 indicated by numerals in Figure 2, and looking in the direction of the arrow.

The gyroscope comprising my invention is shown to comprise a base 10 having a central hollow bushing 11 providing an inner bearing for a shaft 12. An intermediate bearing 13 is located on a hub 14 concentric with bushing 11 and projecting above the remainder of base 10, and an outer bearing 15, coaxial with bushing 11 and bearing 13, is mounted within a lower annular boss 16 also projecting above base 10. Base 10 is also recessed as is shown in Figures 2 and 4 to receive a pair of normally closed snap switches 17 and 20.

Rotatably supported on bearing 15 is a cam 21. This cam is provided along its outer periphery with worm gear teeth 22 which cooperate in driven relationship with a worm 23 mounted on the shaft 24 of a unidirectional electric motor 25 which is supported by base 10: energization of motor 25 is effective to cause rotation of cam 21 about the axis of its bearing.

Cam 21 is provided with four camming surfaces generally identified by the reference numerals 26, 27, 30 and 31. The relationship between these various camming surfaces is best shown in Figure 5, to which reference should now be made. The rise, top dwell, fall, and bottom dwell portions of each cam are identified by the subscripts r, t, f, and d applied to their respective reference numerals. The zero for angular measurements shown in Figure 5 coincides with the radius extending leftward along line 2—2 from the center of Figure 1, but it must be remembered that the cam followers for cam surfaces 26 and 30 are displaced by 180° from those for cam surfaces 27 and 31, so that they act 180° later than the angles would seem to indicate.

The camming action of cam surface 26 is parallel to the axis of rotation of the cam. Here it will be seen that from 180° to 45° this cam is at its top dwell; from 45° to 167.5° it falls; and from 167.5° to 180° it rises again to its top dwell: this cam has no bottom dwell.

The camming action of camming surface 27 is radially of the cam. From 0° to 112.5° this cam is at its bottom dwell; from 112.5° to 225° it rises; from 225° to 347.5° it is at its top dwell; and from 347.5° to 360° it falls again to its bottom dwell.

The camming action of camming surface 30 is parallel to the axis of rotation of the cam. From 180° to 292.5° this cam rises; from 292.5° to 45° it is at its top dwell; from 45° to 55° it falls; and from 55° to 180° it remains at its bottom dwell.

The camming action of camming surface 31 is also parallel to the axis of rotation of the cam. This camming surface has no top dwell. It is at its bottom dwell from 2.5° to 357.5°, falling away sharply in each direction from a maximum rise at 0°.

Before setting forth the mechanism cooperating with the various camming surfaces just described, further constructional details of my gyroscope which are illustrated in Figures 1–4 should be pointed out. Mounted on bearing 13 there is a Cardanic suspension comprising a yoke member 32 which supports a ring 33 by means of trunnions 34 and 35. These trunnions are releasably secured to ring 33 by any suitable means, and are carried in antifriction bearings 36 in yoke 32.

A pair of further trunnions 37 and 40 are fixed to ring 33 by releasable means 38, and comprise the ends of the central hollow shaft of an internal, wound stator 41 for the induction motor 102. The squirrel cage rotor 42 of this motor is external to the wound central stator, and is pressed into an external flywheel shown at 43: the flywheel and squirrel cage are mounted in suitable antifriction bearings to rotate at a high speed about the fixed central stator in the direction of the arrow in Figure 2. By this rotation, the gyroscopic rigidity of the instrument is maintained. This general type of gyroscope structure is disclosed in Ziehl Patent No. 662,484.

The purpose of this gyroscope is to give an indication of departure of the vehicle carrying the gyroscope from a particular heading. It will be observed that member 32 which carries the gyroscope is pivotally mounted with respect to base 10 by bearing 13, so that if the craft carrying the gyroscope 10 should change its heading, while the gyroscope is in operation, the gyroscope may remain in its original position in space. However, it is necessary to provide means for making evident relative rotation between base 10 and yoke member 32. To this end a bracket 44, best shown in Figure 4, is fastened to base 10, to provide support for a suitably mounted resistance winding 46, best shown in Figure 2, which may most conveniently be wound on a suitable form 47: a pair of conductors 50 and 51 make electrical connections with the ends of winding 46. In a similar fashion yoke 32 is provided with an extension 52; a slider or contacting arm 53 is mounted on extension 52, but insulated therefrom by a suitable member 54, and makes sliding contact with winding 46, and a further conductor 55 makes electrical connection with the slider. Thus upon rotation of base 10 with the respect to stabilized yoke 32, winding 46 moves with respect to slider 53, thus changing the ratio between the resistances of the portions of the winding on opposite sides of the slider. In the normal relationship between the gyroscope and base 10, the slider divides the winding into two equal portions.

My gyroscope is designed for only limited movement about its vertical axis with respect to base 10. To this end stops are provided to prevent this relative movement from exceeding certain limits. A column 56 rises from base 10, and carries an arm 57 bifurcated at its outer end into two branches 60 and 61 bearing adjusting screws 62 and 63 respectively. As best shown in Figure 2, screws 62 and 63 are so arranged as to arrest relative motion between the base and the yoke when this motion exceeds a predetermined angle. In the practice of my invention, I have found that an angle of 25° on each side of the normal position of the gyroscope is sufficient, but it will be appreciated that the magnitude of this angle is a matter of selection. By adjustment of screws 62 and 63 the rotation of yoke 32 about its vertical axis can be limited to any selected extent.

In use the gyroscope is mounted in the vehicle with its spin axis extending normal to the longitudinal axis of the vehicle. It will be appreciated that it is desirable for the spin axis to also be horizontal: the extreme case of departure from this condition is that in which the spin axis is vertical, when the instrument is totally without response to change in heading of the vehicle.

Figure 3:
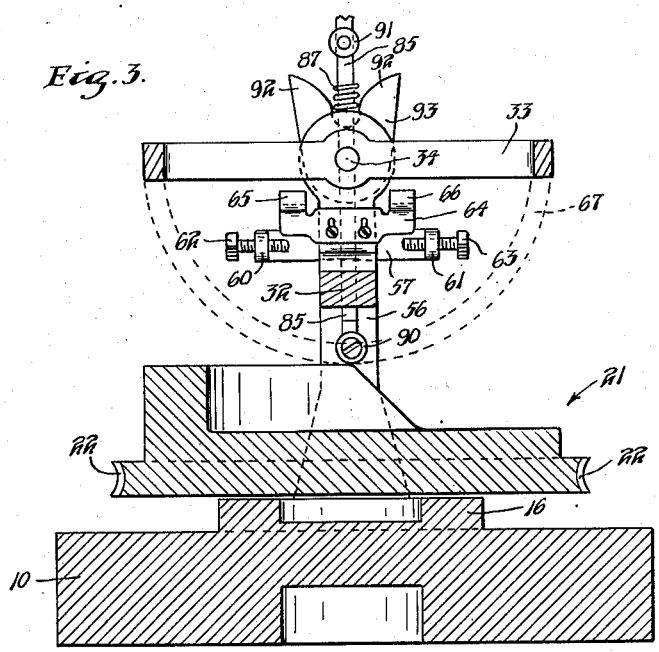
Figure 3 is a sectional view of the instrument, the section being taken generally along a line indicated by numerals 3—3 in Figure 2, and looking in the direction of the arrow.

Means for maintaining the spin axis of a directional gyroscope in a horizontal plane are known in the art and are referred to as erection means, and such devices can be incorporated in this gyroscope if it is desired. However, I have found it sufficient to provide additional stop means to prevent excessive rotation of ring 33 with respect to yoke member 32. The stop means include a member 64 mounted on yoke member 32 by suitable means, and having bifurcations 65 and 66 arranged to arrest ring 33 after a selected amount of deviation from the horizontal on either side of its normally horizontal position. Member 64 may be adjustably mounted on member 32 by a slotted connection as shown in Figure 3, or equivalent means if this is considered desirable. By moving member 64 up or down the angle through which ring 33 may move with respect to yoke 32 is decreased or increased.

While the gyroscope as I have thus far described is perfectly satisfactory for controlling the flight of a craft in a given direction, it is not adapted to use in a craft whose heading may change widely, or whose attitude about the roll axis may change by large amount. Moreover, it is desirable that slider 53 be stabilized at the center of winding 46 for any desired heading throughout the 360° azimuth circle. I therefore provide a caging mechanism which locks the gyroscope and the base in a predetermined relationship whenever the operator of the vehicle decides to change the heading of the craft, or to perform such other maneuvers as would ordinarily cause the gyroscope to strike a stop and therefore to tumble. This latter situation is encountered more especially in military aircraft, for example, where the need for evasive maneuvers to avoid enemy craft or anti-aircraft fire may arise at any time. When such an emergency occurs, or when any permanent change in the heading of the craft is to be initiated, it is essential to have a gyroscope which can immediately be controlled to prevent tumbling, and it is also desirable that when the emergency is over or the turn completed the gyroscope may be allowed to resume control of the craft with a minimum of delay.

I have found that this is best accomplished by caging the gyroscope as rapidly as possible so that its spin axis takes a predetermined relationship to the attitude of the craft, and then maintaining it in this relationship until the need for evasive maneuvers is over: when the craft again permanently assumes the desired attitude the gyroscope is again released. Release of a caged gyroscope presents no particularly difficult problems, but rapid caging of a gyroscope is a different matter, because of the tendency of the gyroscope to "spiral" to its erect or caged position rather than to move there directly. I have found however that if the gyroscopic rigidity of the instrument can be overcome, the tendency to spiral disappears, and its attitude may be changed just as rapidly as that of any mechanical device having the same amount of non-gyroscopic inertia. This is normally as fast as a caging motor can operate.

A principal feature of the present invention resides in the sequence which I follow in caging the gyroscope. This sequence commences with destroying the gyroscopic rigidity of the instrument by temporarily holding or braking the gyroscope against movement about one of its precession axes while a centering force is applied to the gyroscope about the other precession axis. Once gyroscopic rigidity is destroyed, the centering of the gyroscope and the locking thereof about the other precession axis may take place at any desired speed since movement of the gyroscope about this axis is no longer restrained. Thereafter the original braking mechanism is returned to its normal position, the locked condition of the gyroscope about the other axis now taking the place of the braking mechanism. The final step of the sequence follows, namely centering and locking the gyroscope about the axis about which its movement was originally braked. The application of the centering torque about this axis which was originally braked simultaneously with the locking of the gyroscope about the other axis maintains the destruction of gyroscopic rigidity such that the gyroscope offers substantially no resistance to this centering operation and the gyroscope is rapidly centered and locked about this axis. The means for caging the gyroscope in the above described sequence will now be set forth.

It will be appreciated that at the instant when it is decided to cage the gyroscope described above it can be located at any position within a 50° range about its vertical axis, and in any position within the limits set by member 64 as regards rotation about the axis of trunnions 34 and 35. The first step in the caging sequence is to fix the gyroscope in whatever position it may happen to have about this second axis. The means to accomplish this includes an arcuate member 67 depending from ring 33. Member 67 is circular, as indicated in Figure 3, the center of the circle lying in the axis of trunnions 34 and 35, and the outer surface of the member is provided with suitable friction means, which may be a fine knurling or a separately applied friction material. There is also provided a shoe 70 which has a short concave arcuate section of the same radius as the outer radius of member 67, and which may also be provided with a suitable friction surface. Member 70 is pivotally mounted on vertical shaft 12, and is received within a suitable recess 71 in member 32 so that as the latter rotates on bearing 13, the former may also rotate on shaft 12, thus keeping shoe 70 in proper alignment with member 67. Shaft 12 is received within bushing 11 for sliding axial movement with respect thereto. Rotation of shaft 12 with respect to base 10 is prevented by a pin 72 which is pressed into shaft 12, and which is received in a radial slot 73 in hub 14 of base 10.

Camming surface 30 of cam 21 engages the outer end of pin 72, in such a fashion as to cause shaft 12 to rise and fall with rise and fall of camming surface 30. In the bottom dwell of camming surface 30, there is no engagement between shoe 70 and arcuate member 67, and free rotation of ring 33 about the axis of trunnions 34 and 35 can take place. In the top dwell of cam surface 30, shaft 12 is raised so that shoe 70 frictionally engages arcuate member 67, the engagement being sufficient to prevent rotation of ring 33 about the axis of trunnions 34 and 35 under any precessing force which may be developed by the gyroscope during its caging about the axis of bearing 13, which will now be described.

Figure 1:
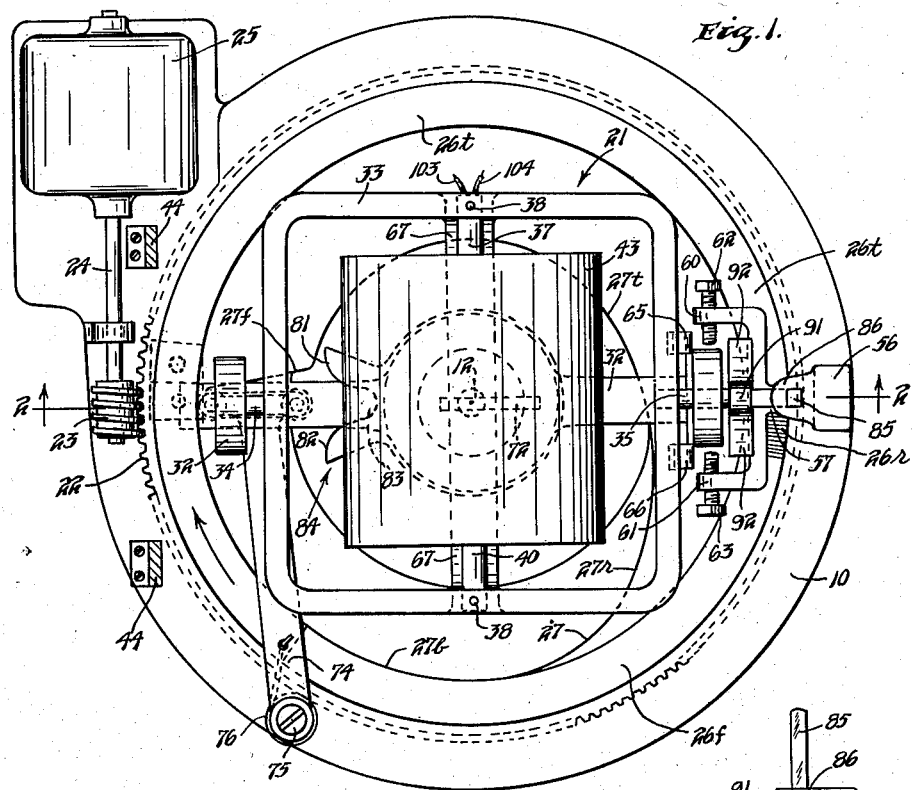
Figure 1 is a plan view of a directional gyroscope embodying my invention, parts being broken away for the sake of illustration.

Caging of the gyroscope about its normally vertical axis is accomplished by means including camming surface 27. To perform this function an arm 74 is pivoted to the base 10 by suitable means 75 which include a spring 76 for urging the arm in a counterclockwise direction as seen in Figure 1. At its inner end arm 74 projects downwardly and carries a pair of cam followers 77 and 80, which therefore move unitarily.

Cam follower 77 engages camming surface 27, and arm 74 is therefore moved inwardly against spring 76 during the rise of cam 27, and outwardly by spring 76 during the fall of cam 27. Cam follower 80 engages a camming surface 84 having a pair of extensions 81 and 82 and a central recess 83. Recess 83 is formed with parallel side walls for a short distance above a semicircular bottom portion whose radius is that of cam follower 80, so that while the follower may act to change the location of camming surface 84, ultimately being received in recess 83, no force tending to rotate camming surface 84 is effective to cause cam follower 80 to ride up out of its central position.

Camming surface 84 is formed as a part of the lower hub of yoke member 32 as best shown in Figure 2, and is so located that when cam follower 80 fully engages camming surface 84, the yoke member is locked with the spin axis of the gyroscope extending at right angles to the 0° line on cam 21, which I prefer to have coincide with longitudinal axis of the vehicle. In the lower dwell of camming surface 27 there is no engagement between cam follower 80 and camming surface 84, while in the top dwell of camming surface 27, cam follower 80 is fully received in the recess in 84, and thus centers and locks member 32 as regards rotation in azimuth.

Means to return the spin axis of the gyroscope to a normally horizontal attitude with respect to the vehicle must also be provided, and must operate when engagement between shoe 70 and arcuate member 67 is not taking place. To accomplish this a vertical shaft 85 slides in aligned apertures in arm 57 and a second arm 86 of column 56, and is normally urged in a downward direction by spring means 87. Member 85 carries at its lower end a cam follower 90 which cooperates with camming surface 26 of cam 21. Near its upper end member 85 carries a second cam follower 91 which cooperates with a camming surface 92 generally of the same outline as camming surface 84. Camming surface 92 forms a portion of a cam 93 which is carried on an extension of trunnion 35, so that any rotation of cam 93 is effective to cause rotation of ring 33 and with it the rotor 43 of the gyroscope. During the top dwell of camming surface 26 there is no engagement between cam follower 91 and camming surface 92, while during the bottom dwell of camming surface 26, cam follower 91 is fully received in the recess in camming surface 92, and thus centers and locks the ring 33 in its normal horizontal position.

Referring now to Figure 6, it will be seen that my gyroscope is energized from any suitable source of alternating current indicated by the reference numeral 100. The distribution of electrical energy to the gyroscope is controlled by a switch 101, and energizes the split phase spinning motor of the gyroscope, indicated by the reference numeral 102, through conductors 103 and 104, so that the rotor is maintained in continuous operation. In this figure, yoke member 32 is schematically shown as mechanically connected by extension 52 to stabilized slider 53 with respect to winding 46.

The split phase caging motor 25 is shown in Figure 6 as energized from source 100 through conductors 105 and 106, and switch 101, the energizing circuit including one or the other of switches 17 and 20 and a conductor 110. Switch 107 is a single pole double throw switch which completes the circuit from conductor 106 to the caging motor through either switch 17 or switch 20, depending upon the position of switch 107. This switch may be connected for operation by a suitable "turn" knob which simultaneously performs other functions related to change in the heading of the craft.

The normal condition of both switch 17 and switch 20 is that in which the circuit through the switch is completed, and motor 25 operates continuously in the direction of the arrow in Figure 2. Switches 17 and 20 are operated by camming surface 31 driven by motor 25, as suggested by dotted lines 120 in Figure 6, and are so located that only one of them can be operated at any given time. If operation of the motor is interrupted by opening of one of these switches, the circuit can again be completed by throwing switch 107 in the opposite direction so that the current passes through the other of the two switches. The electrical relation between winding 46 and slider 53 is also shown in this figure.

Operation

The operation of my caging mechanism should now be apparent. As shown in Figures 1 and 6, the gyroscope is operating in its uncaged or free position, and slider 53 is free to move with respect to winding 46 in accordance with departure of the vehicle carrying base 10 from its desired direction as maintained by the spinning rotor 43. Caging motor 25 is deenergized at switch 17. If it is desired to cage the gyroscope switch 107 is thrown to its "cage" position, thus energizing caging motor 25 through switch 20. Operation of motor 25 acts through worm 23 to rotate cam 21 at a speed which may be in the neighborhood of 60 revolutions per minute. With the first 2.5° of rotation of the cam, camming surface 31 returns switch 17 to its normal "on" position, and cam 30 begins to raise shoe 70 into engagement with arcuate member 67. By the time cam 21 has rotated to 112.5°, the shoe and the arcuate member are fully engaged, and rotation of the Cardan ring about its axis is prevented. As the cam continues to rotate, camming surface 27 acts on cam follower 77, forcing cam follower 80 into engagement with camming surface 84 and centering the gyroscope about its vertical axis. The engagement of cam follower 80 with the camming surface 84 applies a torque to the gyroscope at substantially the same time that the holding or braking operation referred to above takes place. This restriction of movement of the gyroscope about one axis together with the rotational force applied about the other axis destroys the rigidity of the gyroscope so that there is no gyroscopic resistance to this centering operation which therefore takes place quite quickly and is completed when the cam has rotated to 225°. During this operation camming surface 30 has maintained shoe 70 in contact with arcuate member 67, but between 225° and 235° of rotation of the camming surface 30 the cam follower 72 falls rapidly to its bottom dwell, releasing shoe 70 from engagement with arcuate member 67. During all this rotation of cam 21, camming surface 26 has remained at its top dwell. Now, however, camming surface 26 begins to fall, allowing spring 87 to urge member 85 downwardly so that cam follower 91 engages with cam surface 92 and centers and locks the Cardan ring about the axis of trunnions 34 and 35. During this action camming surface 27 maintains yoke member 32 centered about its vertical axis. After 347.5° of rotation of cam 21 the centering and locking of the Cardan ring has been completed, and camming surface 31 actuates switch 20 to open the circuit to the caging motor. The caging operation is now completed.

When it is desired to uncage or free the gyroscope, switch 107 is thrown to its "free" position. The circuit to the caging motor is now completed through switch 17 and the caging motor operates in the same direction as before. Camming surface 30 remains at its bottom dwell, thus maintaining shoe 70 out of engagement with arcuate member 67. Cam surface 27 falls rapidly, allowing spring 76 to withdraw arm 74 and cam follower 80 from camming surface 84 and so freeing the gyroscope in azimuth, and cam surface 26 rises rapidly, forcing member 85 upwardly against spring 87 to remove cam follower 91 from engagement with cam surface 92 and so freeing the gyroscope in elevation. By the time 360° of rotation of the cam from its original position has taken place, or 12.5° after the switch was thrown to its "free" position, the release of the gyroscope about both its axes is completed, and camming surface 31 actuates switch 17 to interrupt the circuit to the caging motor. The gyroscope is now again fully free for maintaining the desired attitude in space.

In the foregoing specification I have disclosed a new means for supporting a directional gyroscope, and for rapidly and gently caging it according to a preferred sequence of operation. It will be appreciated that instead of operating the slider 53, the gyroscope can actuate a direct indicating needle, or it can be constructed to perform other indicating or control functions to which such instruments are adapted, which will at once become apparent to those skilled in the art. It should also be pointed out that while I have disclosed this invention as adapted to a directional gyroscope, the principles here involved can be equally well applied to caging of a vertical gyroscope, and I conceive my invention to be broad enough to include this application.

Numerous objects and advantages of my invention have been set forth in the foregoing description, together with details of the structure and function of the invention, and the novel features thereof have been clearly disclosed. The disclosure, however, is illustrative only, and I may make changes in details, especially in matters of shape, size and arrangement of parts, within the principle of the invention, to the full extent indicated by the broad general meaning of the terms in which the appended claims are expressed.

I claim as my invention:

1. A centering and caging apparatus for a gyroscope having a spin axis and a pair of mutually perpendicular displacement axes, comprising, first centering and caging means for centering and caging said gyroscope in its centered position about a first of said displacement axes, holding means operative simultaneously with the centering operation of said first named means for restricting movement of said gyroscope about the second of said displacement axes and terminating said restricting operation when said first named means has caged said gyroscope about the first of said displacement axes, second centering and caging means for centering and caging said gyroscope in its centered position about the second of said displacement axes after said gyroscope is caged about said first of said displacement axes, and means for operating said first and second named means and said holding means in the foregoing sequence.

2. In a device of the class described, in combination: a gyroscopic rotor; means mounting said rotor for pivotal movement about first and second axes; caging means for said gyroscope, said caging means comprising means opposing movement to lock said rotor about said first axis and substantially simultaneously instituting centering and locking of said rotor with respect to said second axis thereby destroying gyroscopic rigidity upon initiation of said centering and locking action, means freeing said rotor for movement about said first axis, means centering and locking said rotor with respect to said first axis; and means actuating said caging means in the foregoing sequence.

3. In a device of the class described, in combination: a gyroscopic rotor; means mounting said rotor for pivotal movement about first and second axes; caging means for said gyroscope, said caging means comprising means locking said rotor to prohibit movement of said rotor about said first axis and substantially simultaneously centering and locking said rotor with respect to said second axis, means freeing said rotor from said locking means to permit movement about said first axis, means centering and locking said rotor with respect to said first axis; means actuating said caging means in the foregoing sequence; and means releasing said rotor for movement about both said axes.

4. In a device of the class described, in combination: a gyroscopic rotor; means mounting said rotor for pivotal movement about first and second axes; caging means for said gyroscope, said caging means comprising means opposing movement to lock said rotor about said first axis, means centering and locking said rotor with respect to said second axis, means rendering said opposing means ineffective to free said rotor for movement about said first axis, means centering and locking said rotor with respect to said first axis, means unlocking said rotor for movement about both said axes; and means actuating and deactuating said caging means in predetermined sequence in an interrupted cycle.

5. In a device of the class described, in combination: a gyroscopic rotor; means mounting said rotor for pivotal movement about first and second axes; caging means for said gyroscope, said caging means comprising means opposing movement to lock said rotor about said first axis, means centering and locking said rotor with respect to said second axis, means rendering said opposing means ineffective to free said rotor for movement about said first axis, means centering and locking said rotor with respect to said first axis, means unlocking said rotor for movement about both said axes; means actuating and deactuating said caging means in predetermined sequence in an interrupted cycle; and manual means for causing resumption of said cycle after each said interruption thereof.

6. In a device of the class described, in combination: a gyroscope having first and second precession axes; a rotatable cam having a plurality of camming surfaces; motor means for unidirectionally rotating said cam; and means actuated by said camming surfaces, to initially destroy gyroscopic rigidity while simultaneously centering and locking said gyroscope with respect to one of said axes and to maintain the rigidity of the gyroscope destroyed while centering and locking the gyroscope with respect to the other of said axes.

7. In a device of the class described, in combination: a gyroscope having first and second precession axes; a rotatable cam having a plurality of camming surfaces; motor means for unidirectionally rotating said cam in an interrupted cycle; means, actuated by said camming surfaces, to first releasably lock said gyroscope about one of said axes and simultaneously center and lock said gyroscope with respect to one of said axes and thereafter to release said lock and center and lock said gyroscope with respect to the other of said axes, and manual means for causing resumption of said cycle after each said interruption thereof.

8. In a device of the class described, in combination: a gyroscope having first and second precession axes; a rotatable cam having a plurality of camming surfaces; motor means for unidirectionally rotating said cam; and means, actuated by said camming surfaces, to cage said gyroscope by initially destroying its spatial rigidity while centering and locking said gyroscope with respect to one of said axes and to maintain the rigidity of the gyroscope destroyed while thereafter centering and locking the gyroscope with respect to the other of said axes.

9. In a device of the class described, in combination: a gyroscope having first and second precession axes; a rotatable cam having a plurality of camming surfaces; motor means for unidirectionally rotating said cam; and means, actuated by said camming surfaces, to sequentially first oppose motion to lock said gyroscope about one of said axes and simultaneously center and lock said gyroscope with respect to the other of said axes to destroy the spatial rigidity of said gyroscope, then release said gyroscope for motion with respect to said first named axis, and finally center and lock said gyroscope with respect to said first named axis.

10. In a device of the class described, in combination: a gyroscope having first and second precession axes; a rotatable cam having a plurality of camming surfaces; motor means for unidirectionally rotating said cam; and means, actuated by said camming surfaces, to sequentially first oppose motion to lock said gyroscope about one of said axes and simultaneously center and lock said gyroscope with respect to the other of said axes to destroy the spatial rigidity of said gyroscope, then release said gyroscope for motion with respect to said first named axis, then, center and lock said gyroscope with respect to said first named axis, and, finally, interrupt operation of said motor means.

11. In a device of the class described, in combination: a gyroscope having first and second precession axes; a rotatable cam having a plurality of camming surfaces; motor means for unidirectionally rotating said cam; and means, actuated by said camming surfaces, to sequentially first oppose motion of said gyroscope about one of said axes and simultaneously center and lock said gyroscope with respect to the other of said axes to destroy the spatial rigidity of said gyroscope, then release said gyroscope for motion with respect to said first named axis, then center and lock said gyroscope with respect to said first named axis, and then interrupt operation of said motor means, and after separate renergization of said motor means to further sequentially release said gyroscope for movement about both said axes and then again interrupt operation of said motor means.

12. A centering and caging apparatus for a gyroscope having a spin axis and a pair of mutually perpendicular displacement axes, comprising, means for holding said gyroscope in whatever position it may be in respect to a first of said axes and for centering and caging said gyroscope in its centered position about the second of said axes and for releasing said holding means when said centering and caging about said second axis is completed, means for centering and caging said gyroscope in its centered position about the first of said axes, and means for operating said first means and for thereafter operating said second means.

13. In a device of the class described, in combination, a gyroscope having first and second precession axes, caging means for said gyroscope comprising means for initially destroying spatial rigidity of the gyroscope and for sequentially centering and caging said gyroscope about first one and then the other of said precession axes, said caging means including means initially opposing movement of said gyroscope about said other of said precession axes and automatically terminating said opposing movement means when said first named axis is centered.

14. A centering and caging apparatus for a gyroscope having a spin axis and a pair of mutually perpendicular displacement axes, comprising, holding means for holding said gyroscope in whatever position it may be in respect to a first of said axes, first centering and caging means for centering and caging said gyroscope in its centered position about the second of said axes, releasing means for releasing said holding means, second centering and caging means for centering and caging said gyroscope in its centered position about the first of said axes, and operating means for substantially simultaneously operating said holding means and first centering and caging means whereby gyroscopic rigidity is quickly destroyed and for operating said releasing means and second centering and caging means after said first centering and caging means has completed its centering and caging operation.

15. A centering and caging apparatus for a gyroscope having a spin axis and a pair of mutually perpendicular displacement axes, comprising, holding means for holding said gyroscope in whatever position it may be in respect to a first of said axes, first centering and caging means for centering and caging said gyroscope in its centered position about the second of said axes, releasing means for releasing said holding means, second centering and caging means for centering and caging said gyroscope in its centered position about the first of said axes, operating means for substantially simultaneously operating said holding means and first centering and caging means whereby gyroscopic rigidity is quickly destroyed and for operating said releasing means and said second centering and caging means after said first centering and caging means has completed its centering and caging operation, and means for substantially simultaneously releasing both said centering and caging means.

WAYNE A. STONE.

(References on following page)

REFERENCES CITED

The following references are of record in the file of this patent:

UNITED STATES PATENTS

| Number | Name | Date |
|---|---|---|
| 1,996,896 | Bennett | Apr. 9, 1935 |
| 2,383,663 | MacCallum et al. | Aug. 28, 1945 |
| 2,406,342 | Beach et al. | Aug. 27, 1946 |
| 2,519,454 | Granqvist | Aug. 22, 1950 |

FOREIGN PATENTS

| Number | Country | Date |
|---|---|---|
| 471,217 | Great Britain | Apr. 9, 1937 |
| 495,431 | Great Britain | Nov. 14, 1938 |